United States Patent
Iny et al.

(10) Patent No.: US 7,071,866 B2
(45) Date of Patent: Jul. 4, 2006

(54) 2-D RANGE HOPPING SPREAD SPECTRUM ENCODER/DECODER SYSTEM FOR RF TAGS

(75) Inventors: David R. Iny, Baltimore, MD (US); Mark D. Stenoien, Columbia, MD (US); Henry E. Lee, Ellicott City, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 205 days.

(21) Appl. No.: 10/809,369

(22) Filed: Mar. 26, 2004

(65) Prior Publication Data

US 2005/0212692 A1    Sep. 29, 2005

(51) Int. Cl.
*G01S 13/74* (2006.01)
(52) U.S. Cl. ........................ 342/42; 375/130
(58) Field of Classification Search .............. 342/42
See application file for complete search history.

(56) References Cited

U.S. PATENT DOCUMENTS

| | | | |
|---|---|---|---|
| 4,291,410 A * | 9/1981 | Caples et al. ............... | 375/345 |
| 5,025,452 A * | 6/1991 | Sohner et al. ............... | 375/130 |
| 5,159,608 A | 10/1992 | Falconer et al. | |
| 5,193,102 A | 3/1993 | Meidan et al. | |
| 6,002,707 A * | 12/1999 | Thue ........................... | 375/130 |
| 6,047,035 A | 4/2000 | Yellin | |
| 6,211,812 B1 | 4/2001 | Chiles et al. | |
| 6,233,271 B1 | 5/2001 | Jones et al. | |
| 6,329,944 B1 * | 12/2001 | Richardson et al. .......... | 342/42 |
| 6,381,261 B1 * | 4/2002 | Nagazumi .................... | 375/138 |
| 6,567,038 B1 | 5/2003 | Granot et al. | |
| 6,622,024 B1 | 9/2003 | Koo et al. | |
| 6,628,699 B1 | 9/2003 | Ramberg et al. | |
| 6,630,897 B1 | 10/2003 | Low et al. | |
| 6,639,939 B1 * | 10/2003 | Naden et al. ............... | 375/140 |
| 2003/0199252 A1 * | 10/2003 | Tiedemann et al. ........... | 455/69 |
| 2004/0178944 A1 * | 9/2004 | Richardson et al. .......... | 342/43 |

* cited by examiner

*Primary Examiner*—Thomas H. Tarcza
*Assistant Examiner*—Matthew Barker
(74) *Attorney, Agent, or Firm*—Birch, Stewart, Kolasch & Birch, LLP

(57) ABSTRACT

An airborne radar interrogates tags on friendly ground vehicles, which when interrogated by a downlink signal from the radar, sends back a very low level uplink message signal that appears noise-like so as to avoid enemy detection and exploitation. This is achieved by retransmitting a time delayed and phase shifted version of the transmitted pulse from the radar. The digital RF tag captures every other pulse from the radar and transmits a digitally coded spread spectrum pulse back to the radar during every other intervening pulse which includes a pseudo random delay (range hop) and a pseudo random phase (direction).

27 Claims, 9 Drawing Sheets

US 7,071,866 B2

2-D RANGE HOPPING SPREAD SPECTRUM ENCODER/DECODER SYSTEM FOR RF TAGS

BACKGROUND OF THE INVENTION

1. Field of the Invention

This invention relates generally to coding techniques utilized in connection with spread spectrum radar systems and more particularly to a secure spread spectrum (SS) encoding technique which merges communication and radar technologies, whereby an airborne radar interrogates and receives pseudo noise coded messages from one or more ground based digital RF tags.

2. Description of Related Art

Spread spectrum is a well known modulation technique wherein a transmitted RF signal is spread over a wide frequency band and has particular applicability not only in communication systems, but also in the field of radar where there is a need for avoiding detection by countermeasure systems employed either on the ground or by other aircraft. This technique is typically utilized in connection with synthetic aperture radar (SAR) and ground mapping target indicator (GMTI).

Several general types of spread spectrum techniques are known. One type is known as direct sequence modulation and involves modulation of a carrier by a digital code sequence whose bit rate is much higher than the information signal bandwidth. The second type employs FM modulation called "chirp" wherein a carrier is swept over a wide band during a given pulse interval. The third type involves carrier shifting or hopping in discrete increments in accordance with a predetermined code sequence.

Thus in all cases, spread spectrum transmission thus involves expanding the bandwidth of an information signal, transmitting the expanded signal, and then recovering the desired information signal by remapping the received spread spectrum original information signal's bandwidth.

SUMMARY

It is an object of the present invention, therefore, to provide a hybrid communication technique which combines spread spectrum communications and radar pulse compression techniques in conjunction with digital RF tags, whereby a radar performing a surveillance mission e.g., SAR mapping additionally interrogates tags on friendly ground vehicles, which when interrogated by a downlink signal from the radar, sends back a very low level uplink message signal that appears noise-like so as not to degrade the primary surveillance mission, and to avoid enemy detection and exploitation.

This is achieved by retransmitting a phase shifted and time delayed version of the transmitted pulse from the radar. The digital RF tag captures every other pulse from the radar and transmits a digitally coded spread spectrum pulse back to the radar during every other intervening pulse which includes a pseudo random delay (range hop) and a pseudo random phase (angle). The uplink digital code comprises a coding structure which includes "soft symbol" message symbols consisting of n2 pulses preceded by a preamble (prefix symbol) of n1 pulses and terminated by a last (suffix) symbol consisting of n3 pulses, with the preamble and last symbols having sufficient signal to noise ratio to make initial and final detections by the radar. The message symbols are decoded in the radar by a sequential pruning of a hypothesis tree implemented with a series of matched filters. An important feature is that error correction code is built into the spread spectrum bandwidth expansion, rather than (or in addition to) applying an error correction code to information bits prior to spread spectrum bandwidth expansion. This provides a richer alphabet for the error correction code.

Further scope of applicability of the present invention will become apparent from the detailed description provided hereinafter. It should be understood, however, that the detailed description and specific example, while indicating the preferred embodiment of the invention, is given by way of illustration only. Accordingly, various changes and modifications within the spirit and scope of the invention will become apparent to those skilled in the art from this detailed description.

BRIEF DESCRIPTION OF THE DRAWINGS

The present invention will become more fully understood from the detailed description provided hereinafter and the accompanying drawings, which are given by way of illustration, and thus are not limitative of the present invention, and wherein.

DETAILED DESCRIPTION OF THE INVENTION

Figure 1:
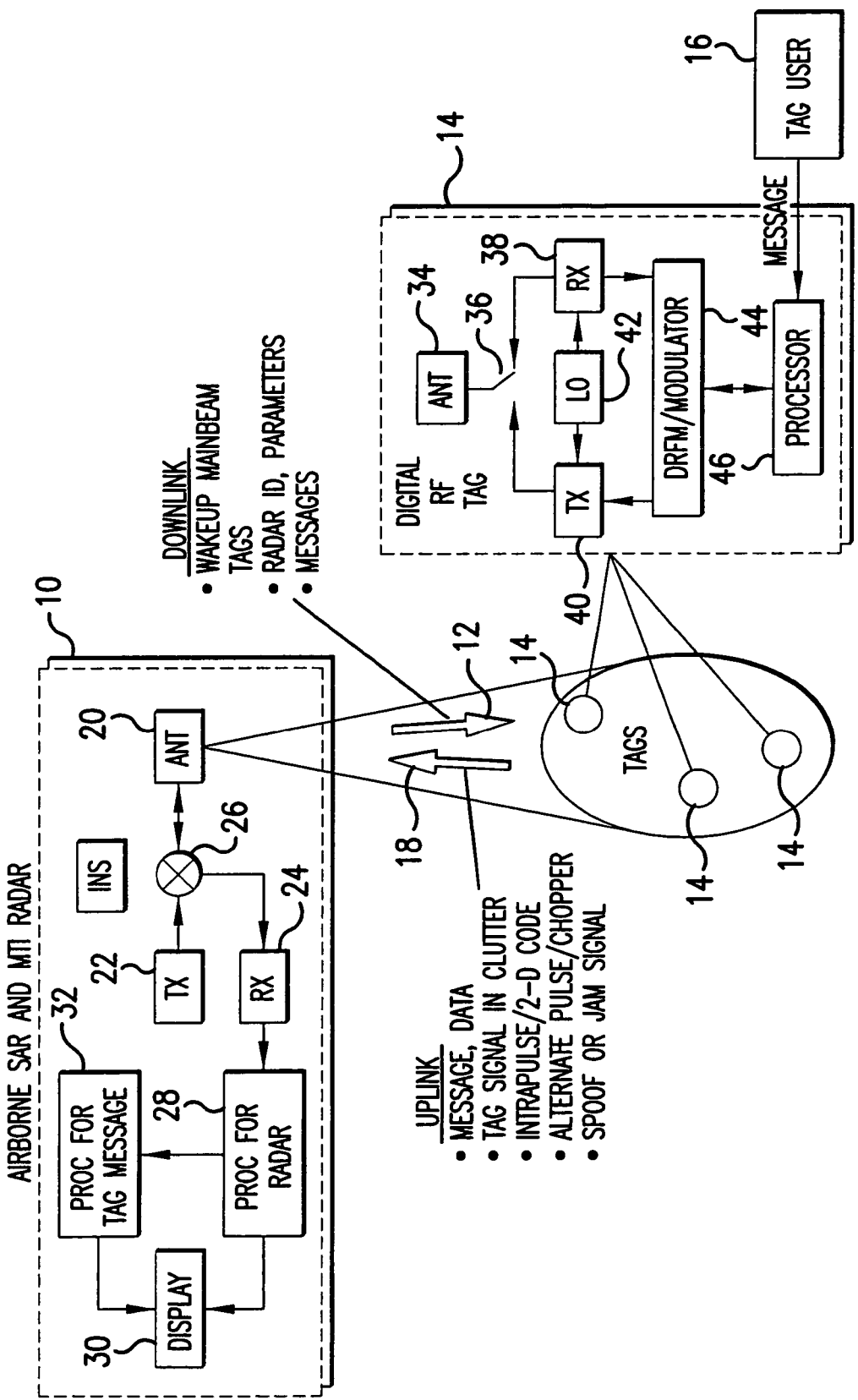
FIG. 1 is a block diagram of an airborne radar system which communicates with a digital RF tag which receives a downlink radar signal and codes messages and data from a tag user and transmits the encoded data back to the radar in an uplink signal.

Referring now to the drawings wherein like reference numerals refer to like components throughout, reference will first be made to FIG. 1 wherein there is shown a block diagram illustrative of the subject invention. Shown in FIG. 1 is an airborne synthetic aperture radar (SAR) 10 which in addition to its normal radar mode is operable to transmit a downlink RF signal 12 to a ground based digital RF tag 14 located, for example, on a ground vehicle, not shown. Also shown is a tag user 16 consisting of, for example, apparatus used by a person on the ground vehicle wishing to communicate a message up to the radar 10. The tag user 16 generates a digital message which is fed to the tag 14. The tag 14, in turn, generates and transmits a digital pseudo noise coded RF uplink spread spectrum message signal 18 back to the radar 10. One tag 14 and tag user 16 are shown in FIG. 1 for simplicity; however, there are generally multiple tags in a specific area of use governed by respective different users.

The radar includes apparatus for generating and transmitting the downlink signal and for receiving and responding to the uplink signal transmit/receive antenna alternately coupled to an RF transmitter section the receiver section is connected to a radar processor section, which generates the necessary signals for displaying normal radar return data on a display. What is significant about the radar is that it also includes a separate signal processor 32 for a tag message via the radar processor 28 included in the uplink message signal 18. The tag message signal processor 32 is also connected to the display 30 for displaying decoded messages and data from the tag 14. However, when desirable, the tag message signal processor 32 could be included in the radar processor 28 provided sufficient computational resources are available in the radar processor 28.

As further shown in FIG. 1, the digital RF tag 14 also includes a transmit/receive antenna 34. The antenna 34 is connected by means of an RF switch 36 to either a receiver section 38 or a transmitter section 40. A local oscillator 42 is shown connected to both the transmitter section and the receiver section 38 and 40. A digital RF memory (DRFM) and modulator 44 is located between the transmitter and receiver sections 38 and 40 and a digital signal processor 46.

Upon demand, the radar illuminates the digital RF tag 14 with a downlink sequence of modulated pulses 12 which act to wake up one or more tags 14 as well as providing radar identification and uplink signal parameters and messages. The type of modulation used in the downlink is preferably pulsewidth modulation; however, the type of modulation could also be frequency modulation (FM), FM slope modulation (CHIRP) or a combination thereof. At least one of the illuminated digital RF tags 14 (FIG. 1) captures, i.e. listens to, every other pulse from the radar and responds by transmitting message data from the tag user 16 at every other intervening pulse. Alternatively, a chopper technique could be employed whereby listening takes place on parts of the pulse and transmitting takes place on other parts of the pulse; however, this results in a loss in signal, which would require less energy efficient transmission of the tag message.

The tag message in the uplink RF signal 18 is a code division multiple access (CDMA) signal, that is, multiple tags broadcast simultaneously, but they are "separated" in the sense that their codes are orthogonal. The tag messages are encoded as a coded pseudo random pulse sequence of delays and pseudo random phases so that it is covert under the cover of clutter. All tags look like noise to other tags and all transmit back to the radar at the same time. In decoding any one tag, the effect of other tags transmitting to the radar is to raise the noise floor, i.e. increase the noise level. When the number of tags is less than a critical number, the raised noise floor is negligible; however, tags in excess of the critical number will start to degrade performance. The radar detects the uplink pulse sequence 18 from the tag(s) 14, which is first de-chirped and motion compressated and then fed to the tag message processor 32 for message decoding, which will now be described.

Considering now the details of the coding and decoding technique associated with the uplink pulse sequence of a tag message, an underlying premise to this approach is that if the total signal to noise ratio (SNR) per bit exceeds just slightly some level (Shannon's bound), then for extremely long messages, near perfect transmission can be achieved. If the total signal to ratio per bit is just slightly below this level, then no matter what the code, the probability of a transmission error is nearly one. If the SNR exceeds Shannon's bound, then Shannon showed that almost every random code book will achieve nearly perfect transmission.

Random codes have little structure, therefore they are complex. Accordingly, the coding structure in most instances must be highly complex. However, this implies that optimal decoding is also highly complex. Conventional turbo codes solve this problem by passing the information bits through a highly complex interleaver and concatenating the parity bits of a simple error code with another simple code on the original information bits (parallel concatenated, i.e. linked, codes). This allows for an almost optimal recursive decoding. The present invention, therefore, provides a complex code that enables trading off decoding complexity and energy efficient transmission, so as to enable near Shannon bound performance.

In the preferred embodiment of the subject invention, a pseudo-random noise code is generated such that each possible message corresponds to a different orthogonal code with a large integrated signal to noise ratio (SNR) so as to approach Shannon's bound and comprises a concatenation of "soft symbols" where hard decisions are not made at symbol boundaries, but rather hypotheses are pruned at symbol boundaries during decoding, meaning that the most unlikely hypothesis are weeded out at the symbol boundaries. These codes are generated using a pseudo-random noise generator 47 shown in FIG. 5 with a common initial seed available at both the tag 14 and the radar 10 for enabling signal correlation. By making soft symbol boundaries where the channel coding branches out, a relatively simple sub-optimal algorithm is constructed which enables the pruning process. Also, as the integrated SNR increases with successive soft symbols, the delayed error in decoding prior symbols goes down dramatically. Consequently, with a slight margin in SNR over the Shannon bound, the number of likely hypotheses that needs to be maintained becomes relatively small. The radar 10 arbitrarily sets the SNR via the down link signal 12 which also includes the parameters that controls the uplink signal 18 as shown, for example, in the following Table I.

TABLE I

| Down Link Parameters For Tags | Considerations | Parameter Range |
|---|---|---|
| Prefix Symbol Scheme Choice | Dense environment can set for parity check to increase SS code distances. Sparse environment can set for improved tag detection/false alarm. Extreme case, one long common prefix coded with PN sequence of slopes and phases | Normally set To achieve 15 DB n1 pulses. |

TABLE I-continued

| Down Link Parameters For Tags | Considerations | Parameter Range |
| --- | --- | --- |
| Sequence length for "Soft" Symbol, n2 | Adjusted to desired SNR per symbol. Long range maps use longer sequences. Dense MAI environments may choose longer sequences. Longer sequences can also be chosen for reduced decoding computation. | 10 to 100 pulses |
| Number of Valid delays (range hops) Per Pulse, Nhop | Larger number of hops improves performance with multiple tags in resolution cell at expense of greater processing. | 100 |
| Crypto Secure seed information | Serves to authenticate tag transmissions by making SS code dependent on initial random seed. | Already part of down link |

Figure 2:
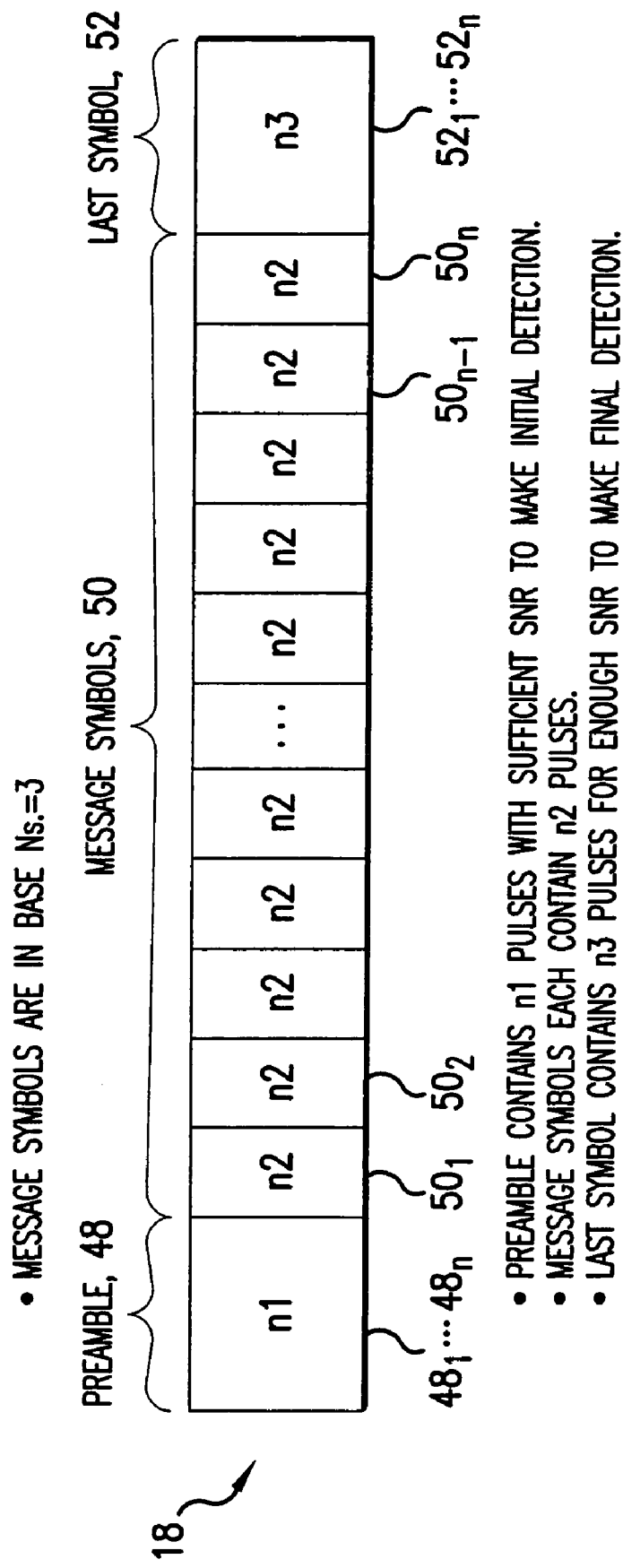
FIG. 2 is a diagram of one tag message packet from the digital RF tag shown in FIG. 1 to the radar in an uplink signal.
Figure 3:
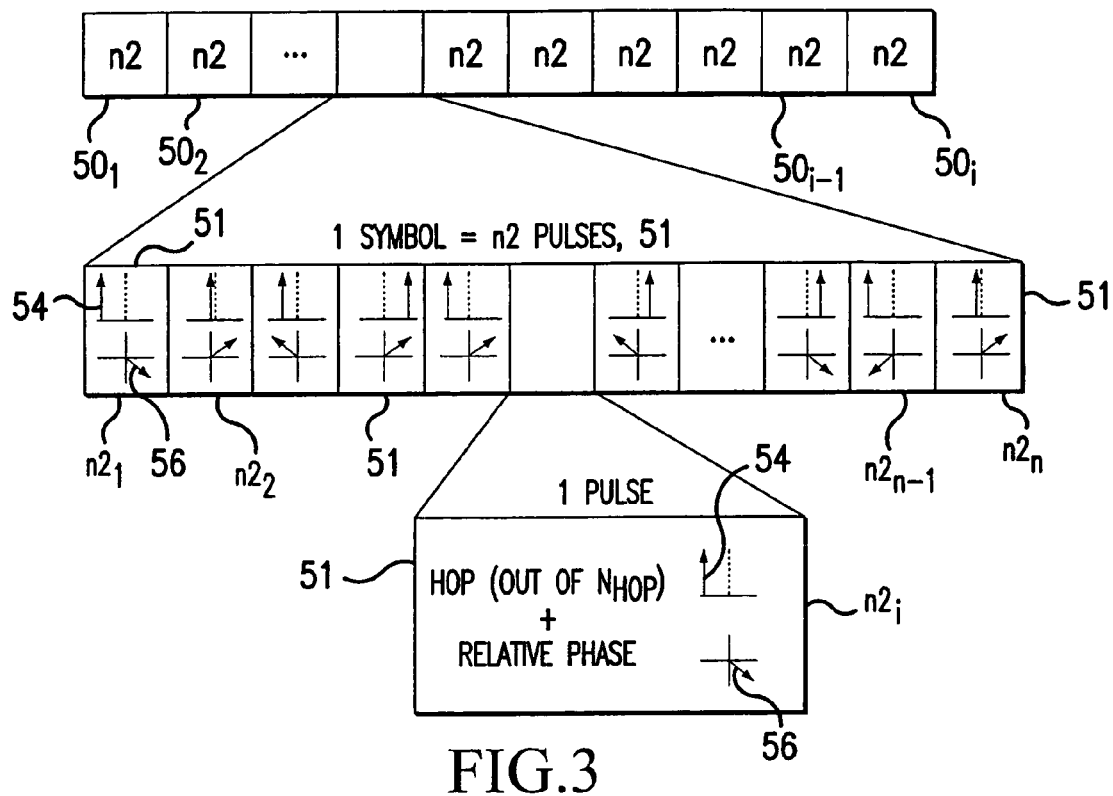
FIG. 3 is illustrative of one symbol of an uplink tag message packet in accordance with a preferred embodiment of the subject invention.

Referring now to FIG. 2, shown thereat is the basic coding structure of the message content of the uplink message signal 18 which includes spread spectrum pulse sequences having two degrees of freedom, i.e., range hopping and phase shifting, to achieve minimal mutual tag interference. It comprises a preamble 48 consisting of a sequence of n1 pulses $48_1 \ldots 48_n$, a plurality of message symbols 50, each consisting of a sequence of n2 pulses $50_1 \ldots 50_n$, and a suffix or final symbol 52 consisting of a sequence of n3 pulses $52_1 \ldots 52_n$. Each of the n1, n2 and n3 pulses include at least one pseudo-random time delay or range hop 54 and a pseudo-random phase 56, as shown in FIG. 3, with respect to a message symbol 50, which are used by the radar 10 to detect a tag's 14 location in range and Doppler from which angle can be derived.

Figure 4:
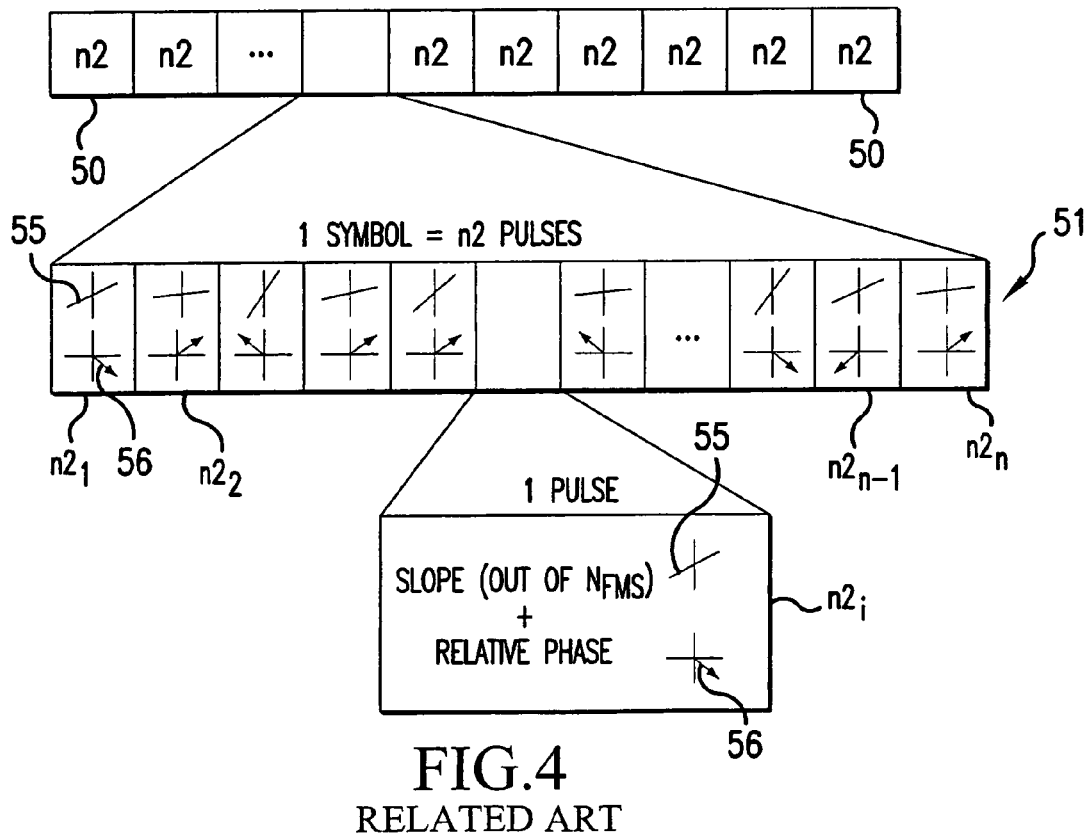
FIG. 4 is a diagram illustrative of one message symbol in an uplink tag message packet used in a related RF tag system.

In a related tag system, as shown in FIG. 4, message symbols 50 consist of a sequence of n2 pulses including a pseudo random linear frequency change or "chirp" 55 and a pseudo-random phase 56. In the present invention, time delays, i.e., range hops are used to prevent the tag from coherently integrating pulse-to-pulse unless the spread spectrum code is known and the message is correctly decoded. Thus, these are not used by the radar to "detect the tag", but rather used by the tag to make the tag look like noise for normal radar processing (i.e., not coherently add up). It represents an improvement over the related tag system in terms of decoding complexity since fast time (single pulse) matched filter processing can piggyback off the normal radar motion compensated and de-chirped signal.

Alternatively, when there are a reduced number of tags, multiple sums of replicated pulses each having a different range hop and phase, could be employed; however, each tag would have to communicate a larger message.

The n1 pulses of the preamble 52 have sufficient signal to noise ratio (SNR) to make an initial detection by the radar which is used by decoding apparatus in the processor 32 to set up a trellis structure implemented by a set of matched filters $57_1 \ldots 57_n$, as depicted in FIG. 8A, which are mutually different for each path through the trellis.

The message symbols 50 comprise "soft symbol" message symbols generated by the tag user 16 (FIG. 1) and their number depend on the message content the user 16 wants to send to the radar 10. The term "soft symbol" means that hard decisions are not required to be made at symbol boundaries as to the portion of the message presently being decoded, except that unlikely hypotheses are discarded in a pruning process of hypotheses. In the sequence of message symbols $50_1 \ldots 50_n$, each succeeding message symbol $50_{i+1}$ depends upon the message content of the previous message symbol $50_i$ in accordance with the soft symbol coding technique whereby a convolutional code is generated capable of approaching Shannon's bound. If a mistake is made on a prior symbol 50, all further communication will look like random noise. Thus, by delaying decoding decisions, prior symbols can be decoded with arbitrary accuracy. Increased decoding accuracy is a tradeoff with computational complexity and tag signal strength.

The last symbol 52 consists of a sequence of n3 pulses having sufficient SNR to provide final message determination (parity).

Figure 5:
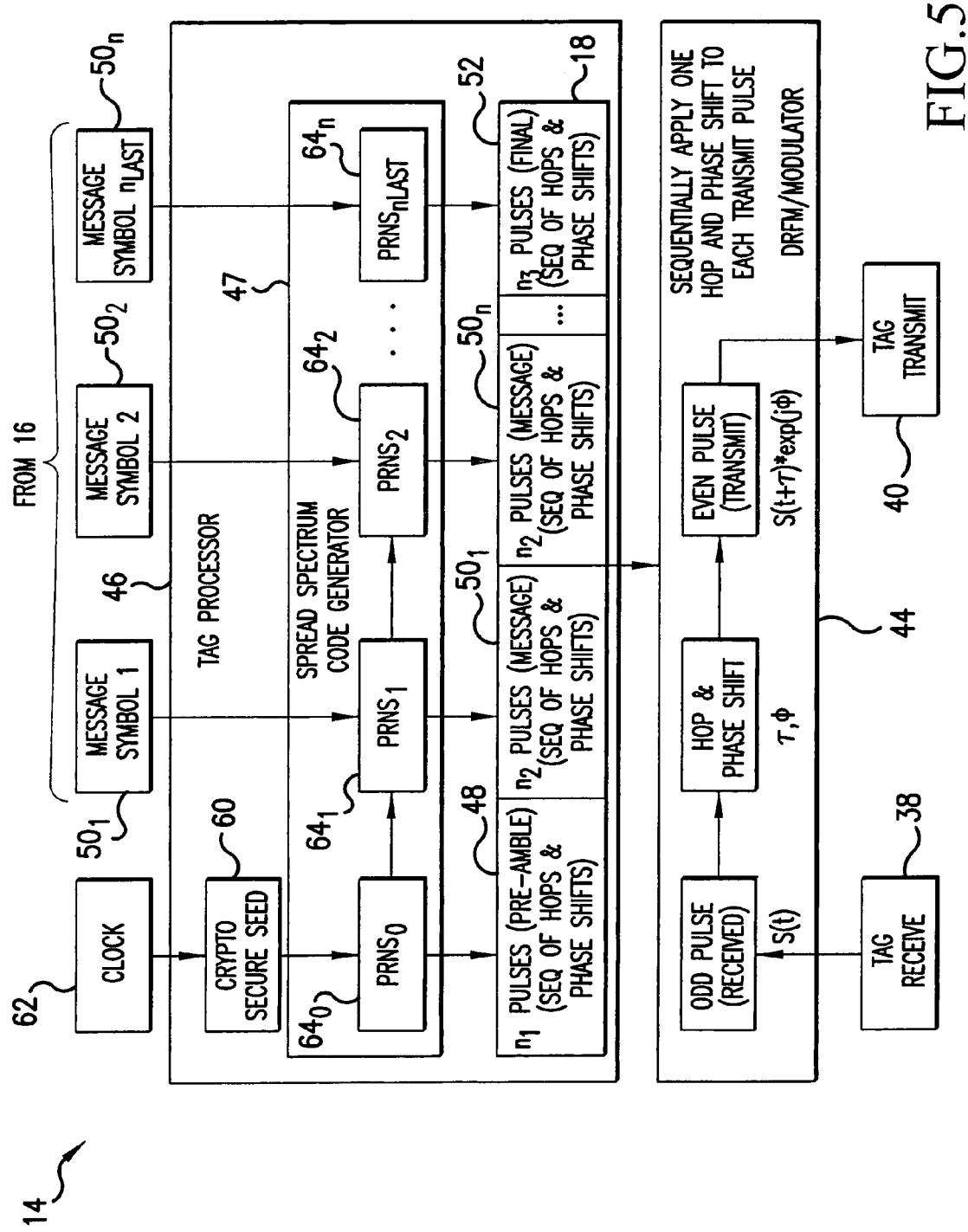
FIG. 5 is a block diagram illustrative of the details of the tag processor included in the digital RF tag shown in FIG. 1.

Referring now to FIG. 5, shown thereat is a block diagram of the details of the tag processor 46 (FIG. 1) located in each RF tag 14 for generating a spread spectrum code for the soft symbols 50 shown in FIGS. 2 and 3. As shown, message symbols $50_1, 50_2 \ldots 50_n$ generated in and supplied from the tag user 16 are fed to the spread spectrum code generator 47 which also receives a crypto secure seed look-up table 60 which is controlled by a clock 62 which is linked to the message processor 32 in the radar so that a common initial seed is provided to both processors 32 and 36 for enabling signal correlation and to insure that if another radar would capture the radar's downlink 12 and rebroadcast it, the tag will be able to recognize that the attempted downlink/wakeup is not valid.

The code generator 47 comprises a computer program loop that separates the initial random seed progressively modified by the message intended by the user 16 into a plurality of code segments $64_0 \ldots 64_n$ comprising pseudo-random noise sequences (PRNS) of n1 pulses, n2 pulses and n3 pulses. The first code segments section $64_0$ comprises a $PRNS_0$ sequence of n1 pulses for the preamble. The intermediate code segments $64_1 \ldots 64_2$, for example, comprising $PRNS_1$ and $PRNS_2$ for the first two message symbols $50_1$ and $50_2$, while the last code segment $64_n$ comprises a last $PRNS_n$ sequence for generating the n3 pulses of the last symbol 52. As noted above, each pulse of the sequence of n1, n2, n3 of the preamble 48, the message symbols 50, and the last symbol 52, each include a pseudo random range hop 54 and a pseudo random phase change 56 shown, for example in FIG. 3, which are sequentially applied to every other radar pulse received by the tag receiver 38 and captured by the digital RF memory (DRFM) and are transmitted back to the radar by the modulator 44 by every other alternate, RF pulse of the uplink signal 18.

Figure 6:
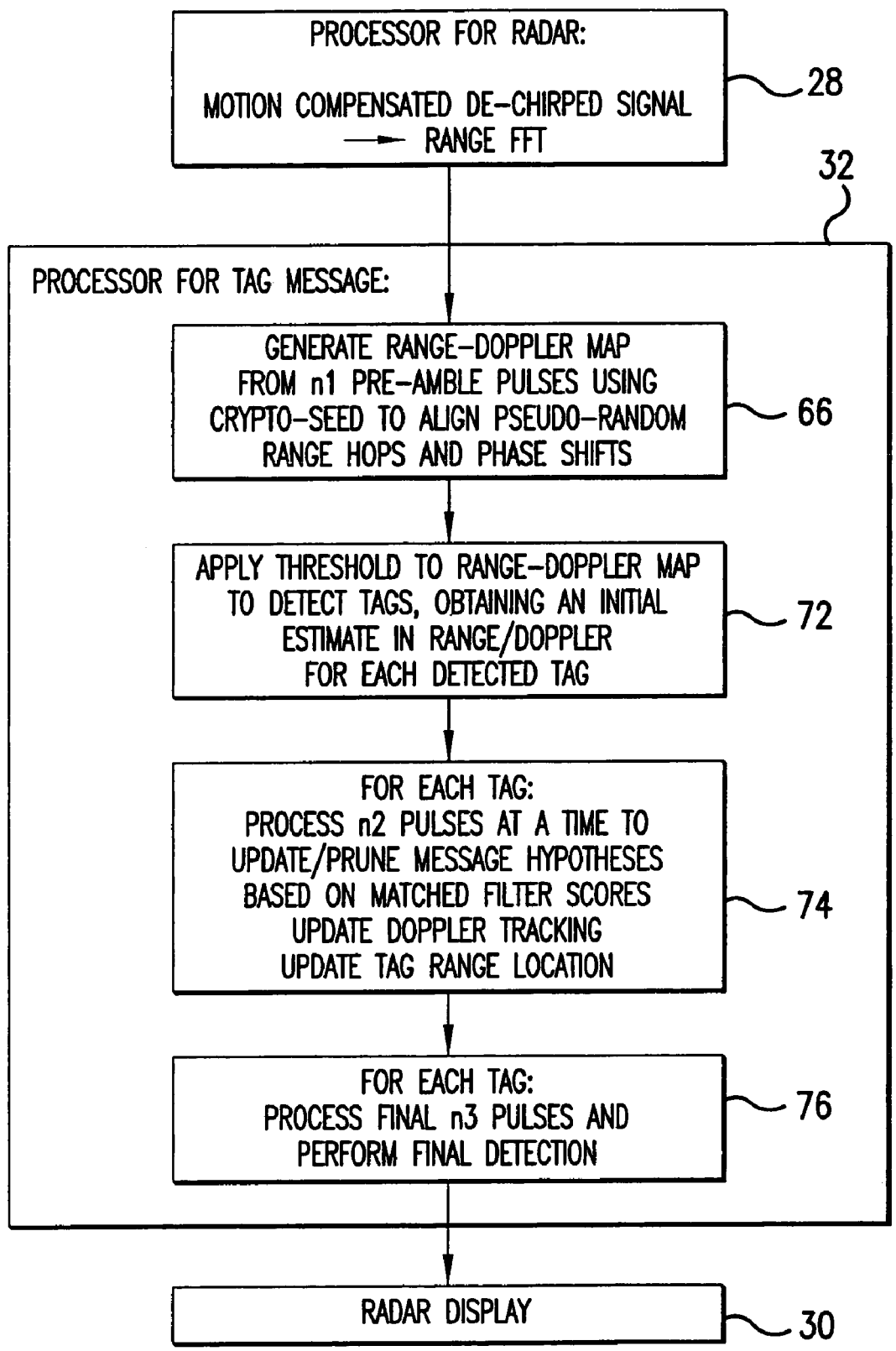
FIG. 6 is a block diagram of the details of the processor for the tag message included in the radar shown in FIG. 1.
Figure 7:
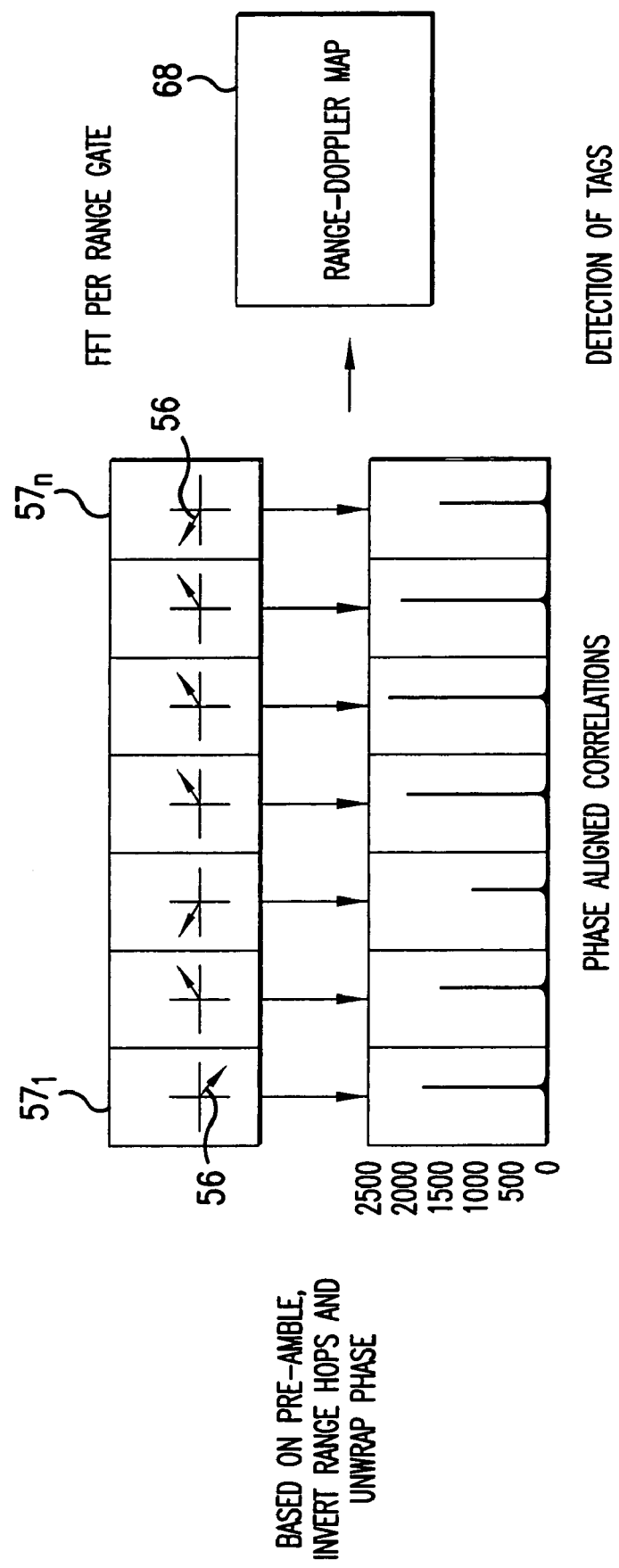
FIG. 7 is a diagram depicting the generation of the range-Doppler map in the tag message processor shown in FIG. 6.
Figure 8:
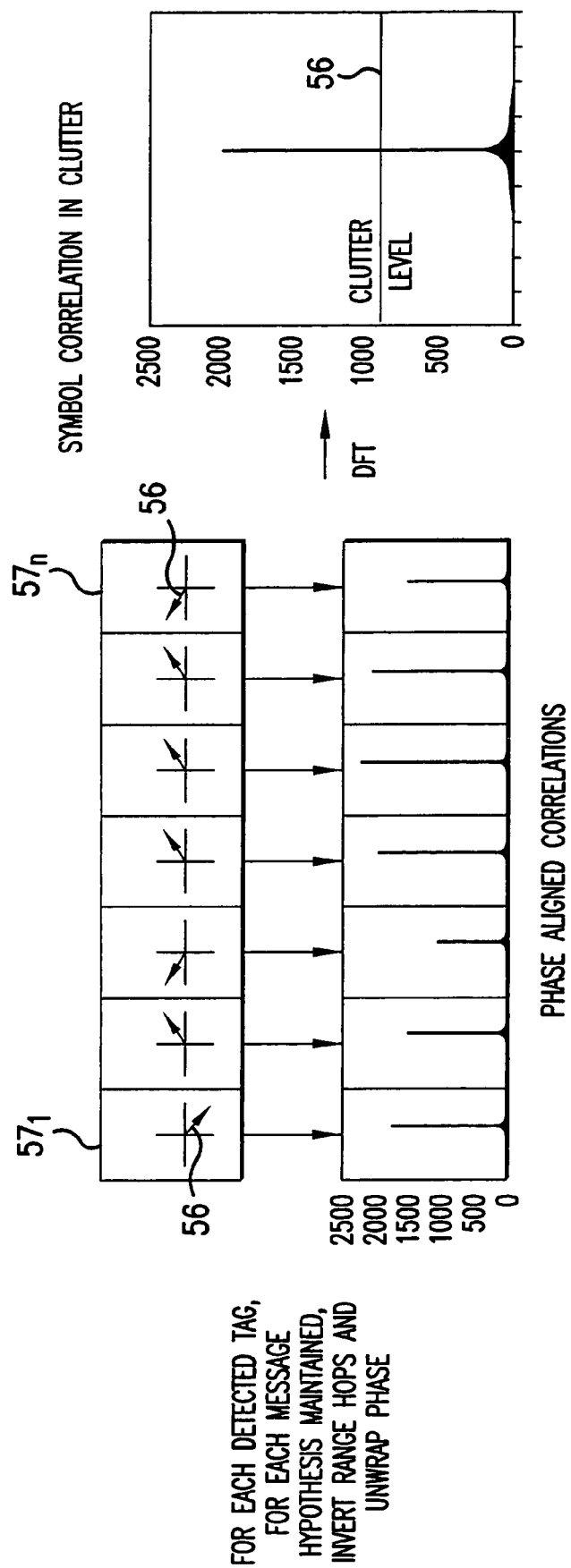
FIG. 8 is a diagram depicting phase align correlations for each detected tag message and running match filters for each hypothesized message.

As noted earlier, the decoding process of the pseudo noise pulses transmitted from the tag 14 up to the radar via the uplink message signal 18 takes place in the processor for the tag message 32 shown in FIG. 1. Reference is now made to FIG. 6 where reference numeral 28 denotes the processor for the radar 10, which initially performs a fast time motion compensated de-chirping of each received pulse followed by a range fast fourier transform (FFT) which provides tag return pulses in range plus delay plus pulse-to-pulse phase modulation which are then fed to the processor 32 for the tag message. A range Doppler map 68 is generated in slow time from n1 preamble pulses as shown by reference numeral 66 using the same crypto seed used by the tag processor 46 shown by reference numeral 60 to invert and align the pseudo random range hops and unwrap the phase shifts as shown in FIG. 7. A clutter threshold 70 is applied to the range-Doppler map 68 in FIG. 7 to obtain an initial estimate in range and Doppler (angle) for each detected tag as shown by reference numeral 72 in FIG. 6. Once a tag 14 has been detected in range and Doppler, symbol correlation can be carried out in clutter as shown in FIG. 8.

Figure 9A:
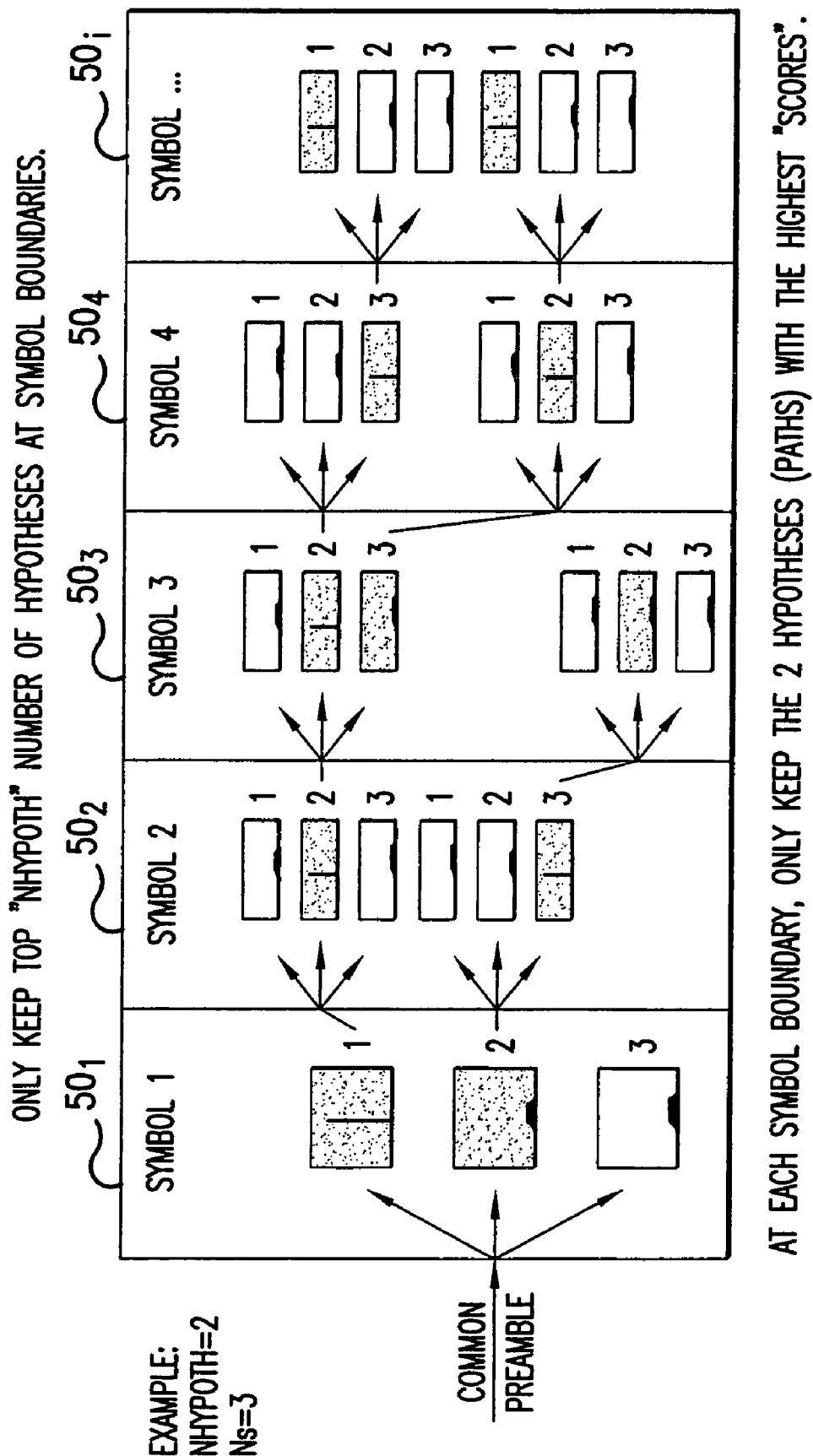
FIGS. 9A and 9B are illustrative of a sequence of pruning message symbols for detecting the message in the tag signal uplinked to the radar from the digital RF tag shown in FIG. 1.
Figure 9B:
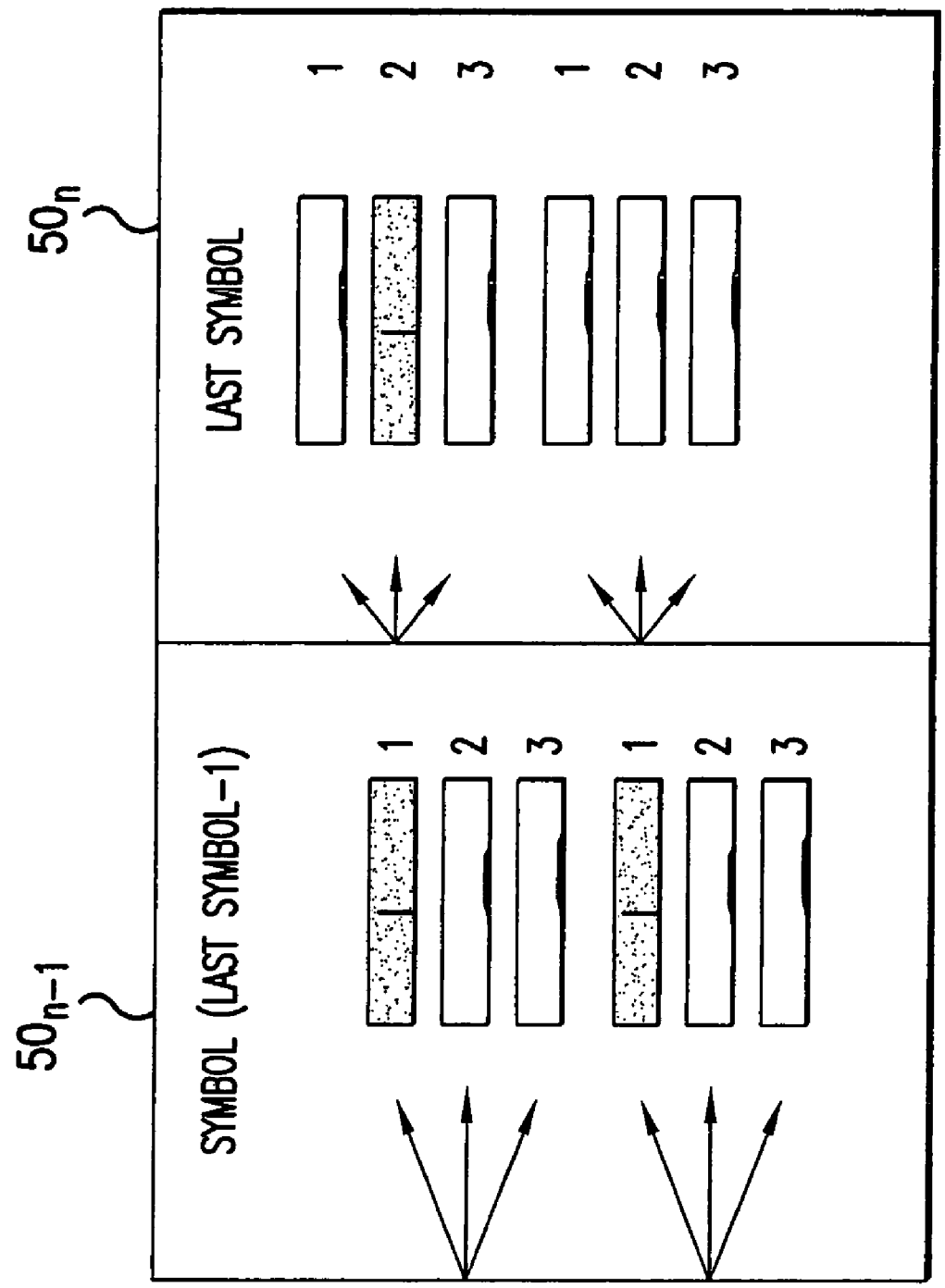

Next, as shown by reference numeral 74 in FIG. 6, the n2 pulses for each message symbol $50_1 \ldots 50_n$ are used in a pruning or discarding process of hypothesis based on matched filter scores as shown in FIG. 9A, whereat each soft symbol boundary, only two hypotheses paths having the highest "scores" of matched filter outputs are retained until the last message symbol $50_n$ is processed with a single score being retained as shown in FIG. 9B. As shown in numeral 74 in FIG. 6, the matched filter also provides a measurement that is used to update the Doppler tracker. The Doppler tracker uses the phase error from the matched filter to estimate Doppler drift. The Doppler estimate is also used to update the tag location in range. Thus, the mechanization allows relatively long integration times, since tag walk in range gates is prevented.

This is followed by processing the final n3 pulses of the last symbol 52 (FIG. 2) so as to perform the final step of detection, whereupon the message data is fed and displayed on the radar display 30 shown in FIG. 1.

Pruning of the soft symbol message symbols 50 are done based on matched filter estimated integrated signal-to-noise ratios over all currently maintained hypotheses. Pruning is performed by eliminating all but the top "nhypth" candidate messages at soft symbol message boundaries. This results in a side benefit of multiple tags in a resolution cell (range) Doppler showing up as two hypotheses that persist throughout the decoding process, resulting in a greater probability of successful decoding of multiple tags in a resolution cell.

Thus what has been shown and described is a secure spread spectrum encoding technique where a radar, for example, performing a surveillance mission interrogates tags on friendly vehicles which in turn transmit a very low level signal back to the radar that appears noise-like so as not to degrade the primary surveillance mission and to avoid enemy detection and exploitation. The RF signal which is transmitted back to the radar from the RF tags consists of phase shifted, delayed versions of every other pulse transmitted from the radar.

The invention being thus described, it will be obvious that the same may be varied in numerous ways. Such variations are not meant to be regarded as a departure from the spirit and scope of the invention, and also such modifications as would be obvious to one skilled in the art are intended to be included within the scope of the following claims.

What is claimed:

1. A method for providing spread spectrum communication between first and second apparatus which transmit and receive RF pulse type signals, comprising the steps of:

generating a first message signal by said first apparatus consisting of a sequence of modulated RF pulses;

transmitting the RF pulses of the first message signal to the second apparatus;

receiving the RF pulses of the first message signal transmitted by the first apparatus by the second apparatus;

generating a second message for transmittal to the first apparatus upon receipt of the first message;

encoding in the second apparatus alternate RF pulses in the sequence of the received first message with the second message by applying a pseudo random time delay and a pseudo random phase shift to each of the alternate RF pulses;

transmitting encoded alternate RF pulses containing the second message back to the first apparatus as a relatively low power level spread spectrum transmission during intervening pulses between the alternate pulses of the RF pulses of the first message;

receiving the encoded alternate RF pulses containing the second message by the first apparatus;

decoding the encoded RF pulses containing the second message; and displaying the second message by the first apparatus.

2. The method of claim 1 wherein the first apparatus comprises a radar system and the second apparatus comprises an RF tag.

3. The method of claim 2 wherein the pseudo random time delay of the RF pulses produces shifts in apparent range, and the pseudo random phase shifts produce discrete incremental changes that prevent the pulses from coherently adding unless the random seed and tag message have been deduced.

4. The method of claim 3 wherein the respective time delays and phase shifts of the RF pulses do not add coherently from pulse to pulse.

5. The method of claim 1 wherein the first apparatus comprises an airborne radar and the second apparatus comprises a digital RF tag.

6. The method of claim 5 wherein the pseudo random time delays of the RF pulses produce range hopping and wherein the pseudo random phase shifts produce shifts in angular direction.

7. The method of claim 6 wherein the RF tag comprises a ground based digital RF tag and wherein the first message signal comprises a downlink signal and the second message comprises an uplink signal.

8. The method of claim 6 wherein the step of encoding includes the step of generating a pseudo random noise code having a seed which is common to both the radar and the tag.

9. The method of claim 8 wherein the step of encoding includes the steps of generating a preamble pulse sequence for making initial detection of a transmission from the tag, generating one or more pulse sequences of message symbols containing the message content desired to be sent back to the radar from the tag, and generating a last symbol pulse sequence for ending the transmission from the RF tag.

10. The method of claim 9 wherein the message symbols comprise soft symbols wherein hard decisions are not required at symbol boundaries.

11. The method of claim 10 wherein each of the soft symbols include a sequence of related message pulses having predetermined message content.

12. The method of claim 11 wherein the message content of the soft symbols depends on the message content of the previous soft symbol and the step of decoding includes sequential depruning of a hypothesis tree of the message content of the soft symbols.

13. The method of claim 9 wherein depruning comprises feeding the sequence of related message pulses of each of the soft symbols through a trellis network that branches out at every one of the related soft symbol message pulses.

14. The method of claim 13 wherein the trellis network is implemented by a set of matched filters each having mutually different filter characteristics whereby unlikely hypotheses are discarded at the soft symbol boundaries.

15. A system for providing spread spectrum communication between radar mounted on a vehicle and at least one RF tag, comprising:
- means for generating a downlink signal by the radar consisting of a sequence of modulated RF pulses for use by said at least one RF tag;
- means for transmitting the downlink signal to the RF tag and wherein the downlink signal operates to wake up the RF tag, as well as providing identification of the radar transmitting the downlink signal and signal parameters for an uplink signal from the tag;
- means for receiving the downlink signal by the RF tag;
- means for generating a message signal for transmittal to the radar;
- means for encoding the message signal in alternate RF pulses of the received downlink signal by applying a pseudo random time delay for providing range hopping and a pseudo random phase shift to each of the alternate RF pulses for producing random shifts in angular direction;
- means for transmitting encoded alternate RF pulses containing the message signal back to the radar as a relatively low power level spread spectrum uplink signal during intervening pulses between the alternate pulses of the RF pulses of the downlink message;

the radar further including:
- means for receiving the encoded alternate RF pulses containing the message signal in the uplink signal;
- means for decoding the encoded RF pulses containing the message signal; and
- means for displaying a decoded message signal.

16. The system of claim 15 wherein the radar comprises an airborne radar mounted on an aircraft and said at least one RF tag comprises a ground based digital RF tag.

17. The system of claim 15 where said at least one RF tag comprises a plurality of RF tags and wherein the RF pulses transmitted from the RF tags are transmitted to the radar in a code division multiple access (CDMA) methodology.

18. The system of claim 17 wherein each of the tags includes a digital RF memory for capturing the alternate RF pulses in the downlink signal.

19. The system of claim 17 wherein each of the RF tags includes means for a pseudo random noise code having a seed for enabling signal correlation which is common to both the radar and the RF tag.

20. The system of claim 19 wherein the seed is a randomly selected seed.

21. The system of claim 19 wherein the message signal includes, a preamble pulse sequence for making initial detection, a plurality of message symbol pulse sequences of the message content to be sent back to the radar, and a last symbol pulse sequence for ending the message signal.

22. The system of claim 21 wherein the message symbol sequences comprise soft symbols.

23. The system of claim 22 wherein each of the soft symbols includes a sequence of related message pulses having predetermined message content.

24. The system of claim 23 wherein the message content of the soft symbols depend on the message content of the previous soft symbol.

25. The system of claim 24 wherein the means for decoding includes a trellis network implementing a hypothesis tree for depruning the message content of the soft symbols.

26. The system of claim 25 wherein the trellis network that branches out at every pulse of the successive soft symbol message pulses.

27. The system of claim 26 wherein the trellis network comprises a set of matched filters, each having mutually different filter characteristics.

* * * * *